Figure 1:
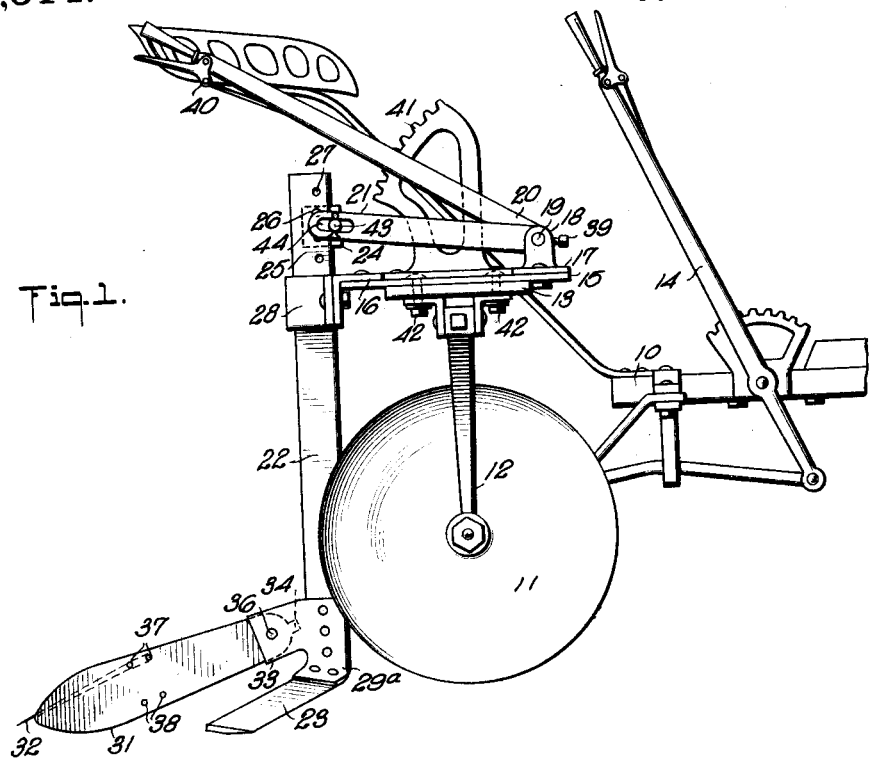

J. T. BERTHELOTE.
WEED CUTTING ATTACHMENT FOR DISK HARROWS.
APPLICATION FILED DEC. 3, 1915.

1,176,514.

Patented Mar. 21, 1916.
2 SHEETS—SHEET 1.

WITNESSES

INVENTOR
J. T. Berthelote
BY
ATTORNEYS

J. T. BERTHELOTE.
WEED CUTTING ATTACHMENT FOR DISK HARROWS.
APPLICATION FILED DEC. 3, 1915.

1,176,514.

Patented Mar. 21, 1916.
2 SHEETS—SHEET 2.

WITNESSES

INVENTOR
J. T. Berthelote
BY
ATTORNEYS

UNITED STATES PATENT OFFICE.

JOSEPH T. BERTHELOTE, OF HAVRE, MONTANA.

WEED-CUTTING ATTACHMENT FOR DISK HARROWS.

1,176,514. Specification of Letters Patent. Patented Mar. 21, 1916.

Application filed December 3, 1915. Serial No. 64,899.

*To all whom it may concern:*

Be it known that I, JOSEPH T. BERTHELOTE, a citizen of the United States, and a resident of Havre, in the county of Hill and State of Montana, have invented a new and Improved Weed-Cutting Attachment for Disk Harrows, of which the following is a full, clear, and exact description.

An object of my invention is to provide a weed-cutting attachment which may be readily applied to disk harrows of standard makes, and to provide means to raise and lower the weed cutting blades, the whole to be bodily attachable to and detachable from the harrow frame.

A further object of the invention is to provide an attachment of the indicated character arranged to dispose the blades adjacent to individual disks at the base of the disks.

The invention also has for an object to provide an attachment of the indicated character improved in various particulars with a view to promote strength, as well as simplicity of construction and adjustment.

The invention will be particularly explained in the specific description following.

Reference is to be had to the accompanying drawings forming part of this specification in which similar reference characters indicate corresponding parts in all the views.

Figure 2:
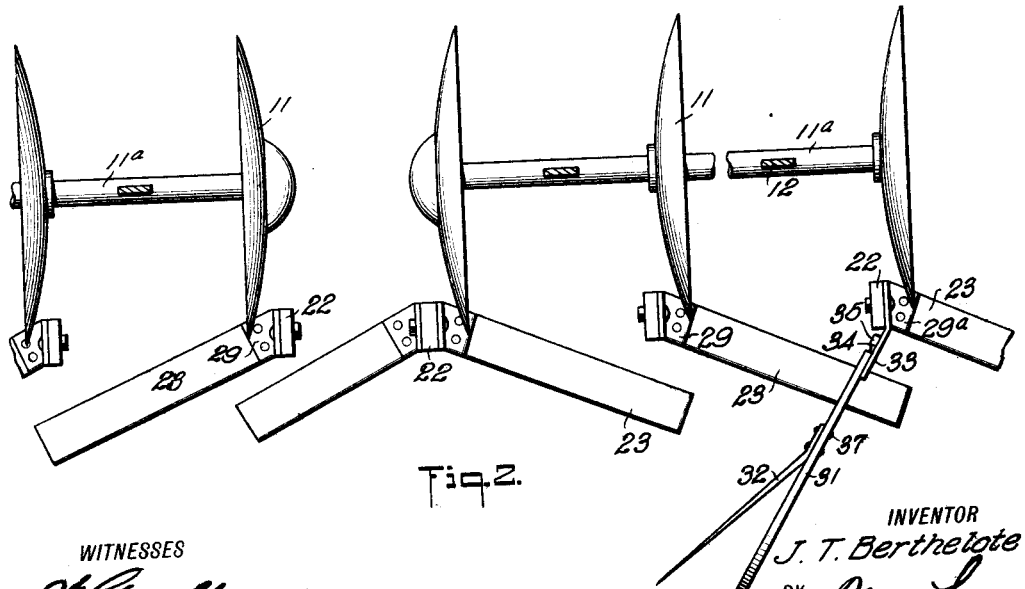
Figure 3:
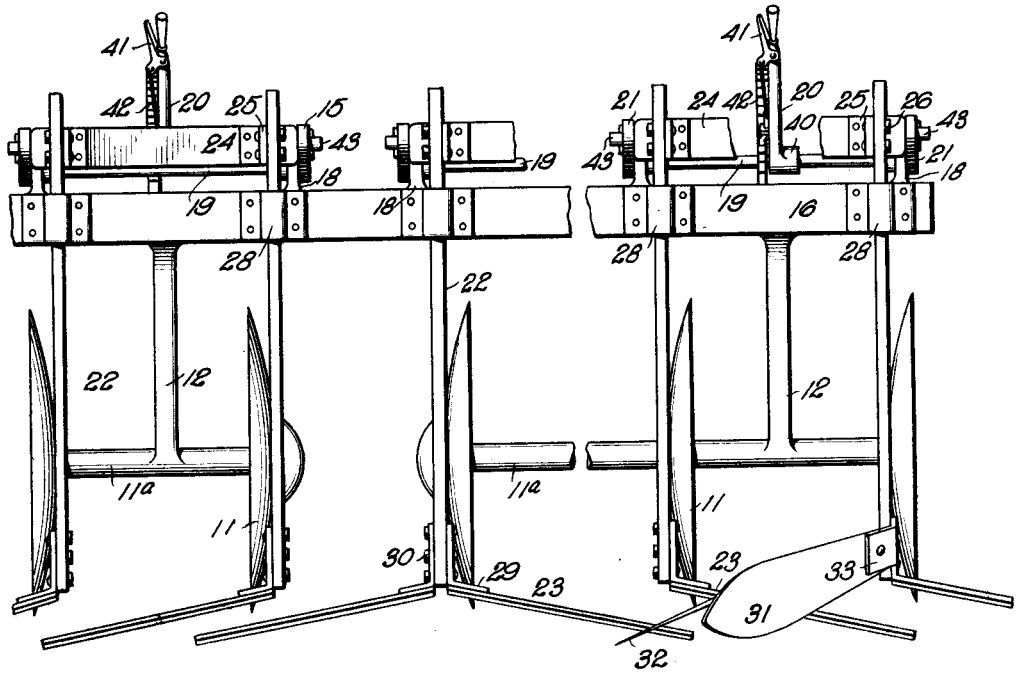
Figure 4:
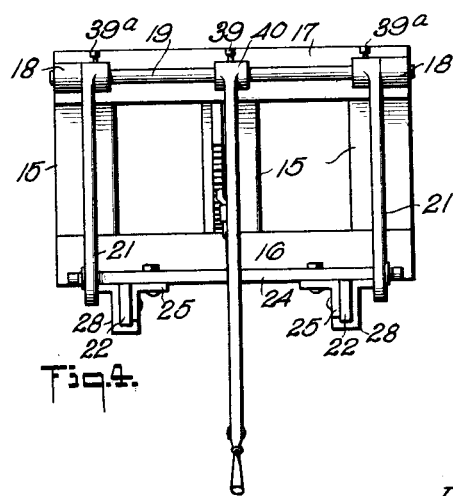

Figure 1 is a side elevation of a weed-cutting attachment embodying my invention, showing the same applied; Fig. 2 is a plan view of the cutting blades and their standards, as well as the harrow disks, the supporting standards of the latter being in section and the lifting and guiding means for the blade standards being omitted; Fig. 3 is a rear view showing a series of my attachments applied; and Fig. 4 is a plan view of one of the units detached from the harrow, the cutting blades being omitted.

My invention is shown in connection with a known type of harrow, having a frame 10, and disks 11, the axle 11ª of the disk being mounted in standards 12 suspended from a frame bar 13.

The numeral 14 indicates the shifting lever for the harrow disks.

In adapting my attachment to the form of harrow illustrated, a series of separate units is employed, each comprising two or more blades with a complement of supporting, lifting, and guiding means. Each unit includes bed plates 15 in suitable number united by a main supporting cross bar 16, which, preferably, is of angle iron. A second cross bar 17 forward of the main supporting bar 16 is provided with bearings 18. In the bearings 18 is journaled a rock shaft 19 to which is secured a lifting lever 20. Secured, also, to the rock shaft 19, are lift bars 21 extending rearwardly from said shaft and connected at their opposite ends with standards 22 of cutter blades 23.

The lift bars 21 in each unit are connected at their rear ends by cross members 24. The connection between the cross members 24 and the blade standards 22 of a unit may be effected by angle irons 25 bolted to said cross members and to said standards. A vertical series of bolt holes 27 may be provided in the standards to receive the bolts 26 for varying the point of connection with the cross members 24.

In order to give guided vertical movement of the standards 22 when raised and lowered, guide sockets 28 are provided, the same being suitably bolted or otherwise secured to the main transverse angle bar 16.

By the described construction, the complete unit may be readily secured in place on the harrow or detached therefrom by bolting the bed plates 15 to the frame members 13. The construction and arrangement are such that the standards 22 will be disposed adjacent to and at the back of the disks 11 adjacent to the periphery thereof, whereby the blades 22 will be caused to travel along a line adjacent to the base of the respective disks. The head of each blade may consist of an angle piece 29, the several heads being secured to the standards by bolts 30 or equivalent means. Each blade is set backward of the head 29, that is, the cutting edge is disposed at an angle to a transverse line drawn through the several standards. Also, the blade is tilted slightly forward so that the cutting edge is lower than the rear edge of the blade, as best seen in Fig. 1. Thus, the blade will extend from a vertical line at the back of the disk across the plane of the disk to a point approximately in line with an adjacent disk so that the areas traversed by the cutting blades will overlap.

For cleaning a margin and indicating the line of work, a grass-board 31 is provided to be carried by the blade standard 22 of the outside disk. A deflecting or clearing finger 32 is provided on the grass-board to deflect the weeds and trash from the outer end of the said board. The clearing finger 32 is at an angle to the base of the grass-board 31 as seen in Fig. 2, and also, the said finger dips toward its rear end. The finger may be secured by bolts 37 and there may be provided in the grass-board 31, holes 38 in different positions to receive the bolts 37, whereby to locate the clearing finger 32 at different elevations on the grass-board.

To detachably secure the grass-board 31 in position on the arm 33, said grass-board is formed with a tang 34 at its forward end receivable in a socket 35 on the face of said arm 33. A bolt, or the like, indicated at 36 in Fig. 1, serves to complete the connection. The described manner of securing the grass-board 31 permits of the same being reversible to adapt it to either side of the harrow, there being provided an arm 33 of bracket 29ª on the outer standard at each side of the harrow. It will be seen that by removing the grass-board from the socket 35 and reversing the grass-board, it will be adapted to the arm 33 at either of the outer standards.

To adjustably secure the lifting lever 20 on the rock shaft 19, a set screw 39 is provided on the hub 40 of said lever, there being set screws 39ª to secure the lift bars 21. The lifting lever 20 is equipped with the usual latch 40 to engage a toothed sector or rack 41 to hold the blades 23 at a given elevation.

Except at the center, where the disks are reversed or disposed back to back, the standards 22 carry each a single blade 23. On the central standard an additional blade, 23ª, is provided to overlap the adjacent blade 23 of the opposite series.

The means shown for securing the unit in place on a harrow consists of the bolts 42 by which the disk standards or hangers 12 are secured to the harrow frame 13, said bolts passing also through bed plates 15.

The lift arms 21 have a slot and pin connection with the cross connecting member 24, there being pins 43 on the ends of the said member and slots 44 in the lift arms.

Having thus described my invention I claim as new, and desire to secure by Letters Patent:

1. A cutter attachment for disk harrows, consisting of a unit including longitudinally ranging bed plates, a main supporting cross bar connecting the rear ends of said bed plates, said cross bar being of angle iron presenting a vertical member in the rear of the bed plates, a second cross bar connecting the forward ends of the said bed plates, bearings on the second cross bar, a rock shaft journaled in said bearings, a lifting lever secured to said rock shaft, lift bars also secured at their forward ends to said rock shaft, a cross member connecting the rear ends of the said lift bars, standards secured to the said cross member, guide sockets through which the said standards extend and in which they have guided movement, said sockets being secured to the vertical member on the main cross bar, and cutter blades carried by the standards at the lower ends and extended laterally therefrom, the said blades being disposed in the same direction at an angle to the line of draft of the attachment and the path traversed by one overlapping the path traversed by the next adjacent blade.

2. A cutter attachment for application to disk harrows, the said attachment including standards spaced to correspond with the positions of harrow disks, a lateral blade carried by each standard at the lower end of the latter, said blades ranging rearwardly from the connection with the standards and the free end of one blade extending laterally beyond the head of the next adjacent blade, supporting means adapted for attachment to a harrow, lift means on said supporting means and connected with the standards, means to actuate the lift means, and means to secure said attachment to a disk harrow with the respective standards adjacent to the peripheries of the harrow disks at the back thereof.

3. The combination with a disk harrow of a cutter attachment including standards positioned adjacent to the respective harrow disks at the backs thereof, separate cutter blades on the said standards at the lower ends thereof, said blades extending laterally in the rear of the respective disks adjacent to the base line of the latter, across the planes of the respective disks.

4. The combination with a disk harrow of a cutter attachment including standards positioned adjacent to the respective harrow disks at the backs thereof, separate cutter blades on the said standards at the lower ends thereof, said blades extending laterally in the rear of the respective disks adjacent to the base line of the latter, across the planes of the respective disks, and means to raise and lower the standards and blades relatively to the disks, the free ends of the said blades extending beyond the heads of adjacent blades.

5. A cutter attachment for disk harrows consisting of a unit including longitudinally ranging bed plates, a supporting cross bar connecting the rear ends of said bed plates, a second cross bar connecting the forward ends of the said bed plates, a rock shaft journaled in bearings in the second cross bar, lift bars secured at their forward ends to said rock shaft, means to actuate said lift bars, means connecting the rear ends of the said lift bars, standards secured to the last-mentioned means, cutter blades carried by the standards at their lower ends extending laterally therefrom, and means to give guided movement to the standards.

6. A cutter attachment for harrows, including standards, lift means for said standards, means to mount said means on a harrow, cutter blades extending laterally from the standards at their lower ends, a grass-board, and means to support the grass-board on one of said standards adjacent to the cutter blade thereof.

7. A cutter attachment for harrows, including standards, lift means for said standards, means to mount said means on a harrow, cutter blades extending laterally from the standards at their lower ends, a grass-board, and means on certain of the standards adjacent to the blades thereof to detachably and reversibly support the grass-board.

8. A cutter attachment for harrows, including standards, lift means for said standards, means to mount said means on a harrow, cutter blades extending laterally from the standards at their lower ends, a grass-board, and means to support the grass-board on one of said standards adjacent to the cutter blade thereof, said grass-board having a clearing finger thereon at an angle to a side of the blade and extending toward the rear end of said blade.

9. A cutter attachment for harrows including standards, lift means for said standards, means to mount said means on a harrow, cutter blades extending laterally from the standards at their lower ends, an arm on one of said standards near the blade thereof and extending rearwardly from the standard, a socket on said arm, and a grass-board having a tang adapted to detachably engage said socket.

In testimony whereof I have signed my name to this specification in the presence of two subscribing witnesses.

JOSEPH T. BERTHELOTE.

Witnesses:
T. L. ASHTON,
JOHN H. DEVINE.

Copies of this patent may be obtained for five cents each, by addressing the "Commissioner of Patents, Washington, D. C."